US006659701B1

(12) United States Patent
Risdale

(10) Patent No.: US 6,659,701 B1
(45) Date of Patent: Dec. 9, 2003

(54) ROCKER PANEL FASTENER

(75) Inventor: Marc R. Risdale, Toronto (CA)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/273,339

(22) Filed: Oct. 17, 2002

(51) Int. Cl.$^7$ ............................................... F16B 19/00
(52) U.S. Cl. ......................... 411/508; 411/510; 411/913
(58) Field of Search ............................ 411/350, 552, 411/508, 509, 510, 913

(56) References Cited

U.S. PATENT DOCUMENTS

| | | | | |
|---|---|---|---|---|
| 4,227,287 A | * | 10/1980 | Gunther | 411/350 X |
| 4,920,618 A | * | 5/1990 | Iguchi | 411/508 X |
| 5,123,795 A | * | 6/1992 | Engel et al. | 411/552 |
| 5,775,859 A | * | 7/1998 | Anscher | 411/509 X |

* cited by examiner

Primary Examiner—Neill Wilson
(74) Attorney, Agent, or Firm—Mark W. Croll; Paul F. Donovan

(57) ABSTRACT

A panel fastener for assembling a panel structure to a substructure is herein disclosed. The fastener comprises a body having a pair of offset flanges connected by a hollow support structure having a bore formed therethrough that is connected to a head having a third flange and a shank extending therefrom, by at least one flexible member that is connected between the body and the head of the fastener. The shaft of the head further having at least one retaining mechanism formed therein such that when the shaft of the head is inserted through the bore formed through the hollow support structure of the body of the fastener, the retaining mechanism can engage a bore formed through the substructure so as to secure the panel structure thereto.

15 Claims, 3 Drawing Sheets

ROCKER PANEL FASTENER

FIELD OF THE INVENTION

The present invention relates to a fastener that may be pre-assembled with a panel to ease the installation of said panel. More specifically, the present invention relates to a fastener that may be pre-assembled with a panel wherein the fastener is in a recessed position prior to installation of the panel.

BACKGROUND OF THE INVENTION

When assembling a thin, sheet-like part to a thin-walled substructure, such as where a rocker panel is secured to the frame of an automobile, it is common to use single-piece, injection molded plastic fasteners to inexpensively and quickly secure the panel to the metallic support structure. A typical, prior art plastic fastener used in this application is not unlike a typical machine screw, having an upper flange or head from which extends a shaft. However, the shaft of such a prior art fastener typically has a retaining structure that engages a bore formed through the substructure into which the fastener is driven.

Preferably, a typical prior art plastic fastener will be constructed and arranged to be driven into a bore formed in the substructure at relatively low pressures such that special tools are not required to install the fastener. Prior art fasteners may be passed entirely through the part that is to be secured to the substructure or may form a "blind" connection wherein the head or flange of the fastener is inserted and retained in a structure, sometimes known as a dog house, which extends from the undersurface of the plastic part. In any case, because the parts with which typical prior art fasteners are used are often fabricated at locations remote from where the parts are assembled with, their substructures, it is preferred to pre-assemble the fasteners with the part with which they are used. Where this is the case, the part may simply be removed from the container in which it was shipped, positioned appropriately with regard to the substructure, and installed by inserting the shafts of the pre-assembled prior art fasteners into appropriate bores formed through the substructure such that the retaining structures on the shaft of the fasteners can retain the fasteners in the bore in the substructure.

Problems arise however where a relatively rigid part, such as the aforementioned rocker panel, require the use of a plurality of fasteners that are misaligned with one another. In such a case, it may be possible to properly install one or more fasteners or groups of fasteners that are aligned with one another, i.e., the axes along which the shafts of the fasteners extend being substantially parallel with one another, but difficult to install other, distinct fasteners or groups of fasteners that are not directly aligned with those fasteners or groups of fasteners that were first installed. In these instances, pre-assembly of the fasteners with the part may be contraindicated as assembly of the part with its substructure may be difficult or impossible without damage to one or more fasteners or even the part itself. In these cases it is desirable to utilize specially adapted fasteners that facilitate pre-assembly of the part with its requisite fasteners.

SUMMARY OF THE INVENTION

The present invention comprises a fastener for securing a panel to a substructure. This fastener has a body and a head that are resiliently connected to one another to allow for relative movement. The body of the fastener comprises a pair of offset flanges that are connected to one another by a hollow support structure having a bore formed longitudinally therethrough in generally perpendicular relation to the pair of offset flanges. One alternate embodiment of the present invention may include an open channel support structure rather than the hollow support structure. This alternate embodiment is open at one side whereas the hollow support structure is tubular and therefore closed.

The head of the fastener comprises an additional flange from which extends a shaft. This shaft extends generally perpendicular from the flange of the head and has formed therein a retaining mechanism that is constructed and arranged to securely retain the shaft of the fastener within a bore formed in the substructure when the head of the fastener is moved from a first, pre-assembled position to a second, fully assembled position.

The body of the fastener may also comprise one or more retention tabs or members that extend into the space between the offset flanges of the head. These retention tabs are constructed and arranged to engage complementary bores, slots, or depressions formed in the panel structure so as to maintain the fastener in a predetermined location with respect to the panel structure.

The retaining mechanism that extends from the shaft of the fastener may comprise one or more detents, flexible fingers, or frustoconical flexible extensions that extend laterally and toward the additional or third flange of the head of the fastener.

It is to be understood that the fastener of the present invention is well adapted for pre-assembly with a panel by inserting the support structure, open or tubular, a slot formed in a panel structure. When pre-assembled with the panel, the pair of offset flanges of the body of the fastener are positioned on opposing sides of the panel structure. The fastener may be aligned with other fasteners pre-assembled with the panel or may be pre-assembled with one more of the fasteners out of alignment with the remaining fasteners. The pre-assembly of the fastener with a panel and the subsequent assembly of the panel with its substructure are facilitated by the fact that the tip of the shaft of the head of the fastener may be substantially withdrawn into the support structure when the head of the fastener is in a first, pre-assembled position.

The fastener of the present invention lends itself for use in a method of assembling a panel structure to a substructure. In this method a fastener of the type described hereinabove and comprising a body having a pair of offset flanges connected in a generally parallel relationship to one another by a support structure, the support structure having a bore formed longitudinally therethrough, a head having an additional or third flange from which extends in the direction of the body a shaft having at least one retaining mechanism extending laterally therefrom, the shaft extending at least partially into the bore formed through the hollow support structure, the body and the head of the fastener being interconnected by at least one flexible member, a tip of the shaft of the fastener being substantially withdrawn into the hollow support structure, is provided. This fastener is then pre-assembled with the panel structure such that the support structure of the body of the fastener is inserted into a slot formed into the panel structure in a predetermined position with regard to the panel structure. The panel, now pre-assembled with at least one fastener is next aligned with a substructure such that the fastener is aligned with a bore formed through the substructure. Finally, a force is applied to the head of the fastener so as to insert the shaft of the fastener into the bore formed through the substructure such that the retaining mechanism of the fastener engages the substructure and secures the panel structure to the substructure. Note that the body of the fastener may or may not include one or more retaining members or tabs that are constructed and arranged to engage a bore formed in the panel structure so as to align the fastener in a predetermined position with regard to the panel structure.

One area where this method is particularly useful is in the assembly of a rocker panel of an automobile to the frame of the automobile.

DETAILED DESCRIPTION

The fastener 10 of the present invention is constructed and arranged to be pre-assembled with a panel structure 12 such as the rocker panel of an automobile. The fastener 10 is ultimately used to secure the panel structure 12 to a substructure 14 such as an automobile frame. The terms "rocker panel" and "frame" may be used herein interchangeably with the terms "panel structure 12" and "substructure 14", respectively.

Figure 1:
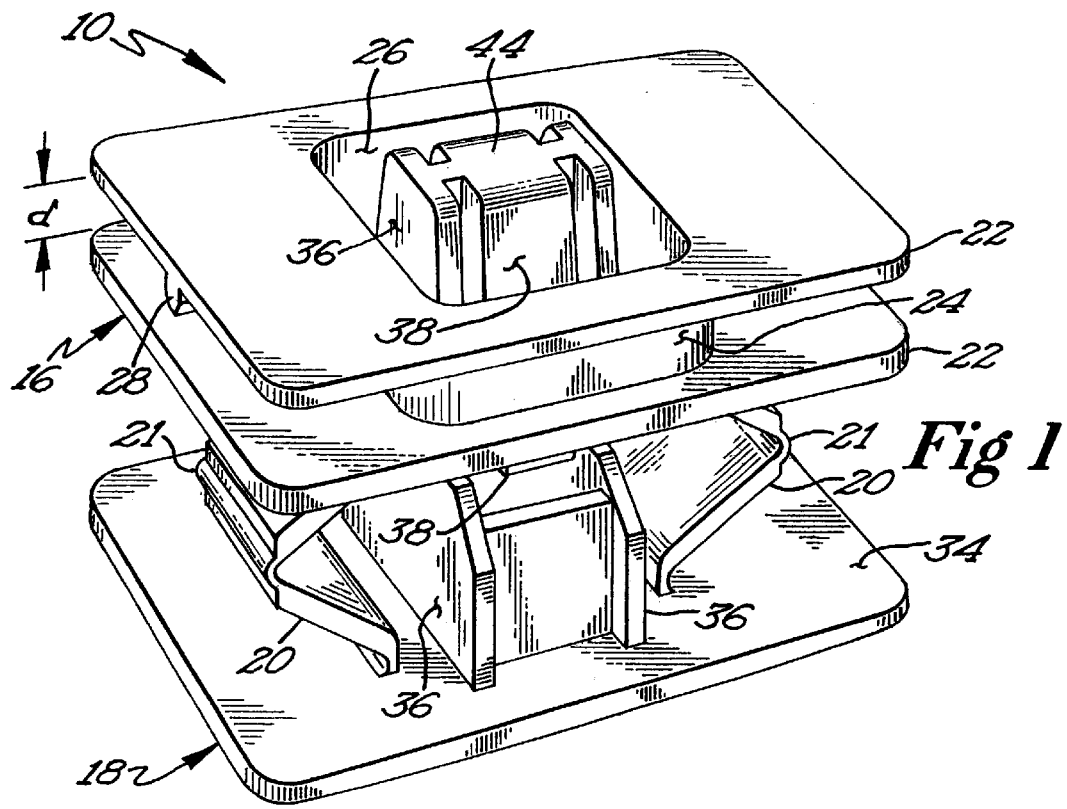
FIG. 1 is a perspective view of the fastener of the present invention.
Figure 2:
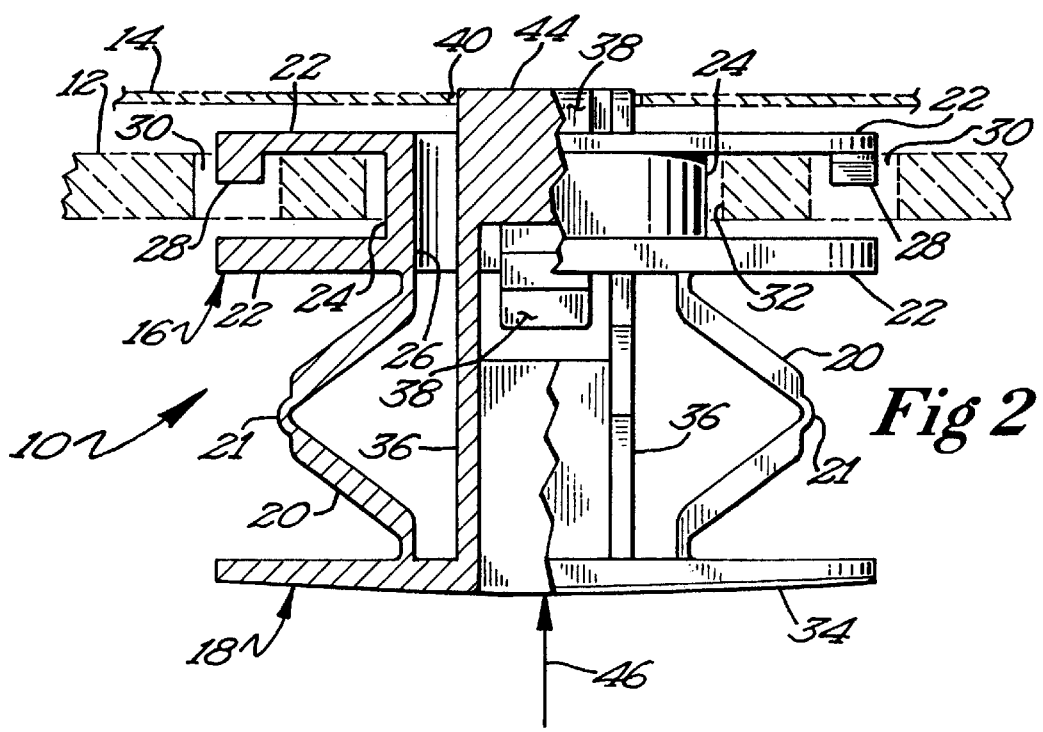
FIG. 2 is a cross-sectional view of the fastener of the present invention shown pre-installed with a panel structure.

Turning first to FIG. 1, the fastener 10 can be seen to comprise a body 16 and a head 18 that are interconnected by one or more flexible members 20. The body 16 itself comprises a pair of offset flanges 22 that are spaced apart and connected by a hollow support member 24. The hollow support member 24 has a bore 26 that passes entirely therethrough in a longitudinal direction. The exterior surface of the hollow support member 24 may be of any suitable shape but is in a preferred embodiment of generally rectangular shape. The flanges 22 are generally parallel to one another and are spaced apart by an offset distance d. This offset distance d is dictated by the thickness of the panel structure 12 with which the fastener 10 is pre-assembled. As can be seen in FIG. 2, the thickness of the panel structure 12 is less than that of the offset distance d.

While not strictly necessary, one or both of the flanges 22 may be provided with one or more retaining members 28. These retaining members 28 are constructed and arranged to be received within retaining bores 30 formed in the panel structure 12. The retaining members 28 insure that the fastener 10 is maintained in a predetermined geographic relationship with the panel structure 12 when the fastener 10 has been pre-assembled with the panel structure 12.

Pre-assembly of the fastener 10 with the panel structure 12 is accomplished by inserting the body 16 of the fastener 10 into a slot or bore 32 formed through the panel structure 12. The slot or bore 32 may be formed directly into the main body of the panel structure 12, such as at the edge of a large plastic panel, or may be formed as part of a dog house, 46 (see FIG. 6), extending from the undersurface of the panel structure 12.

The head 18 of the fastener 10 comprises a flange 34 having an undersurface that faces the body 16 of the fastener 10. From the undersurface of the flange 34 extends a shaft 36. The shaft 36 is arranged generally perpendicular to the flange 34 and extends through the bore 26 formed through the hollow support member 24 in the body 16. As can best be seen in FIGS. 4 and 5, the shaft 36 of the head 18 further comprises one or more retaining mechanisms 38. In a preferred embodiment of the present invention these retaining mechanisms 38 comprise a pair of detents that, once inserted into a bore 40 formed through the substructure 14, act to secure the fastener 10, and hence the panel structure 12 to the substructure 14. The retaining mechanisms 38 take any suitable form and may comprise the detents as illustrated in FIGS. 1–6, a pair of flexible arms or fingers 42 such as that illustrated in FIG. 7, or a plurality of flexible vanes or frustoconical ridges.

The flexible members 20 connect the body 16 to head 18. The flexible members 20 are illustrated as flexible strips having a hinge line 21 at which they are prone to bend. It is to be understood that the flexible members 20 may take many forms and may omit the hinge line 21 while still performing the same function, namely, to resiliently secure the body 16 to the head 18 and to permit relative motion between the body and head.

Figure 4:
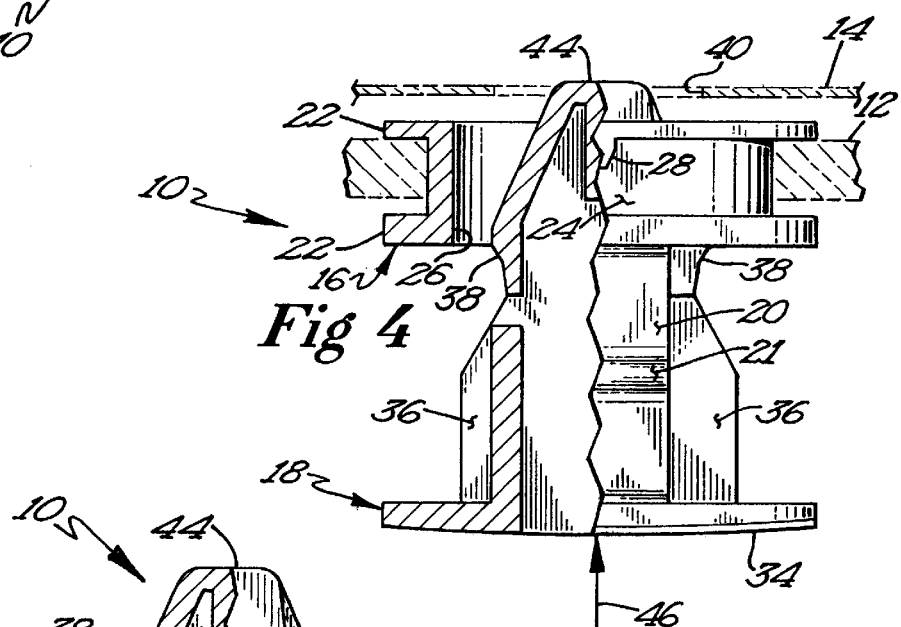
FIG. 4 is a cross-sectional view of the fastener of the present invention taken at 90° from the cross-section of FIG. 2.
Figure 5:
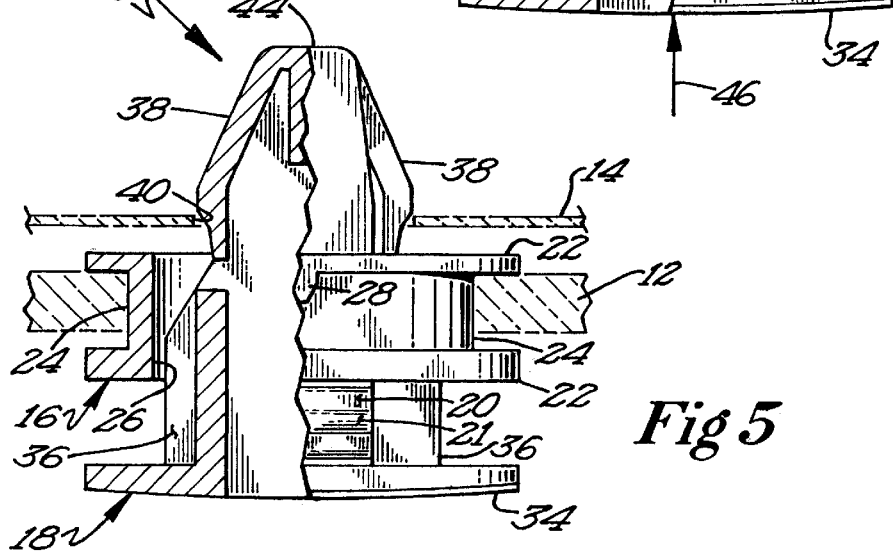
FIG. 5 is a cross-section of the fastener of the present invention taken at 90° to the cross-section of FIG. 3.

When the fastener 10 is in its first, pre-assembled position as illustrated in FIGS. 2 and 4, the shaft 36 of the head 18 is substantially retracted into the hollow support member 24. While in the illustrations the very tip 44 of the shaft 36 may extend slightly from the hollow support member 24, it is to be understood that the tip 44 may extend farther out of, or more preferably, be housed entirely within the hollow support member 24 when in this first, pre-assembled position.

Force applied to the flange 34 of the head 18 of the present invention as shown by arrow 46, best seen in FIGS. 2 and 4, drives the shaft 36 of the fastener 10, through the hollow support member 24 and subsequently through the bore 40 formed through the substructure 14. The distance between the retaining mechanisms 38 and the undersurface of the flange 34 is such that the flexible members 20 will be firmly compressed between the undersurface of the flange 34 and the flange 22 nearest the flange 34. When the shaft 36 of the head 18 has been fully inserted into the bore 40 through the substructure 14, the fastener 10 will be in its second, fully installed position.

In use, the fastener 10 of the present invention is pre-assembled with a panel structure 12 by inserting the hollow support member 24 into a slot or bore 32 formed in the panel structure 12. Preferably, the slot 32 will be formed in the edge of the panel structure 12; however, the fastener 10 may be adapted for use with a dog house 46 such as that shown in FIG. 6. Insertion of the hollow support member 24 into the slot 32 is accomplished such that the offset flanges 22 will be positioned on opposing sides of the panel structure 12. In a preferred embodiment of the fastener 10, the insertion of the hollow support member 24 into the slot 32 will allow the retaining members 28 to engage the bores 30 formed through the panel structure 12. In this way, the fastener 10 can be maintained in a particular, pre-determined attitude and position with regard to the panel structure 12.

Maintaining the fastener 10 in this pre-determined position and orientation facilitates the easy assembly of the panel structure 12 with the substructure 14 to which it is intended to be secured. It is to be understood that the fastener 10 may be constructed and arranged such that the retaining members 28 are omitted. In addition, the slot 32 may be constructed and arranged to engage the hollow support member 24 in a snap-fit arrangement in order to retain the fastener 10 therein. As indicated above, the hollow support member 24 may be of any suitable shape required to be inserted into the slot 32 in the desired manner.

Figure 3:
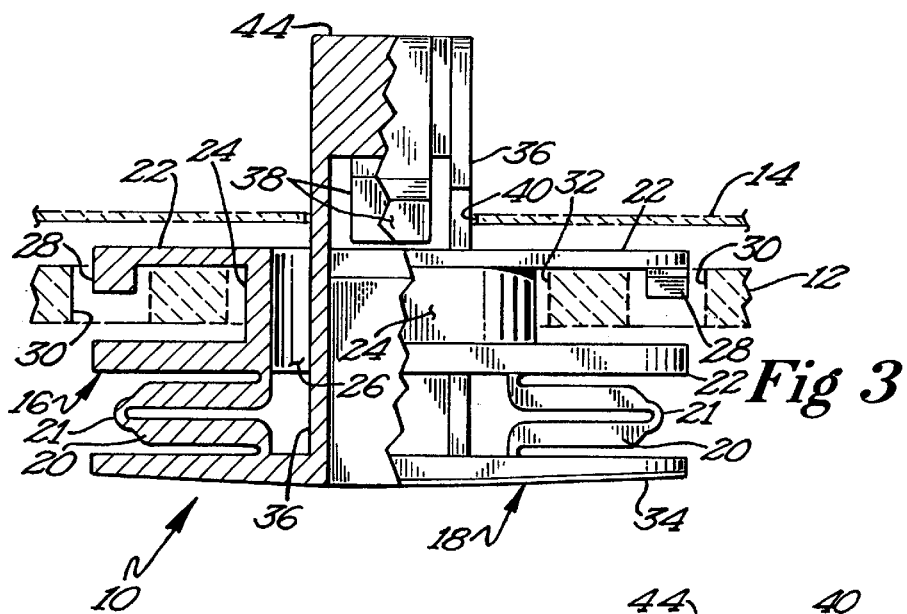
FIG. 3 is the fastener of FIG. 2 shown in its fully installed position wherein the panel with which the fastener is pre-installed has been secured to a substructure.

Once the fastener 10 has been pre-assembled with the panel structure 12, the panel structure 12 may be transported, if necessary, to the location where the panel structure 12 is to be assembled with the substructure 14. The panel structure 12 is then oriented with regard to the substructure 14 and force is applied to the flange 34 of the head 18 of the fastener 10. This force drives the shaft 36 of the fastener 10 into a bore 40 which is aligned therewith. As the shaft 36 is inserted into the bore 40, the force applied to the flange 34 also acts to bend or fold the flexible members 20 from the initial position as illustrated in FIGS. 1 and 2, to their fully folded position as illustrated in FIG. 3. The shaft 36 of the head 18 is inserted into the bore 40 to the extent necessary for the retaining mechanisms 38 extending laterally from the shaft 36 to engage the substructure 14. Where retaining mechanisms 38 such as the detents illustrated in FIGS. 1–6 are utilized, the shaft 36 will be inserted to such a degree that the detents 38 engage the surface of the substructure 14 located opposite the body 16 of the fastener 10.

Figure 6:
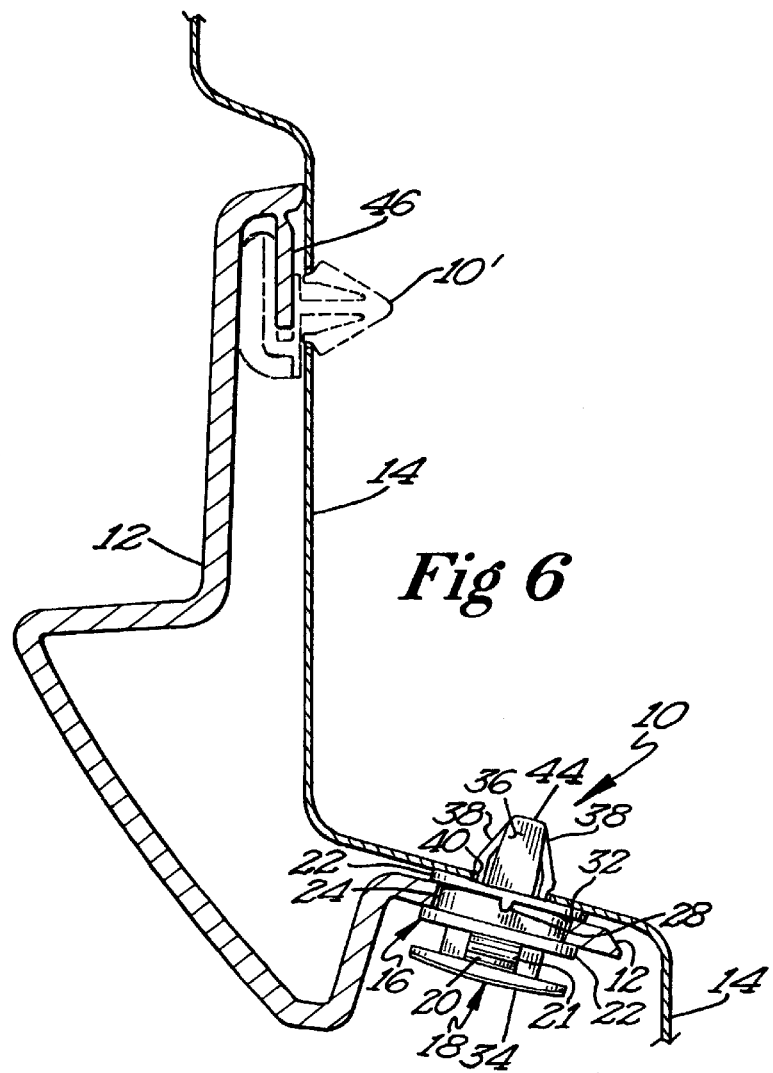
FIG. 6 is a schematic view of the fastener of the present invention fully installed to secure a panel to its substructure.

FIG. 6 is a cross-sectional schematic view of a panel structure 12, in this case a rocker panel of an automobile, that has been assembled with substructure 14, in this case the frame of an automobile. The fastener 10 in FIG. 6 illustrated in solid lines may be used in conjunction with dissimilar fasteners such as that illustrated in the phantom lines at 10' in FIG. 6 or may be used in conjunction with other fasteners 10, not shown. As can be appreciated from FIG. 6, the fastener 10 is misaligned with the fastener 10', i.e., the direction in which the shaft of the fastener 10' extends is not substantially parallel with the direction in which the shaft 36 of fastener 10 extends.

It is to be noted that fastener 10 may be used wherever the body 16 of the fastener may be connected to a panel 12. Accordingly, the fastener 10 may be used in the lower position as illustrated in FIG. 6, or in place of the fastener 10' shown in phantom in FIG. 6. In addition, fasteners 10 may be utilized in both positions illustrated in FIG. 6.

As can be appreciated from FIGS. 2 and 4, prior to assembly with the substructure 14, the tip 44 of the shaft 36 is substantially withdrawn into the hollow support structure 24. This permits the upper fastener 10' to be installed without interference from the shaft 36 that extends fully through the panel structure 12. As illustrated in FIG. 6, the fastener 10' would first be inserted through the substructure 14 and only after this had been accomplished, the head 18 of the fastener 10 would be forced through the substructure 14. In addition, it can be seen that fastener 10' in FIG. 6 is shown making a blind connection between the panel structure 12 and the substructure 14, whereas the fastener 10 is illustrated in FIG. 6 as making a standard through connection between the panel structure 12 and the substructure 14.

Figure 7:
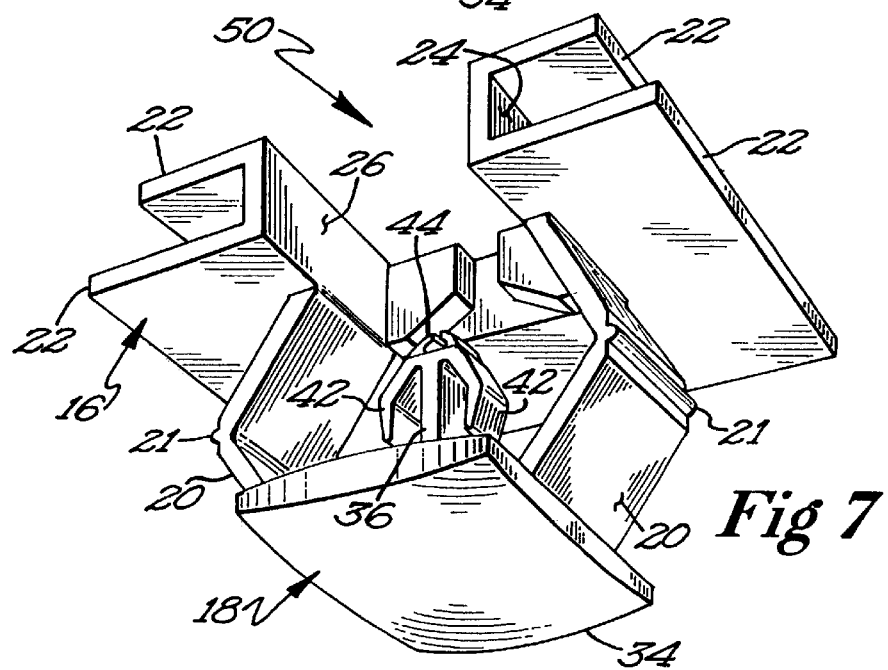
FIG. 7 is a perspective view of an alternate embodiment of the fastener of the present invention.

FIG. 7 illustrates an alternate embodiment of the present invention, designated as fastener 50, in which the hollow support structure 24 of the fastener 50 is open on one edge to form an open ended channel rather than a bore as illustrated in FIGS. 1–6. The fastener 50 functions in the same manner as fastener 50 but requires less material. In addition, the shaft 36 comprises retaining mechanisms 42 which are a pair of flexible arms that are constructed and arranged to engage the substructure 14 so as to secure the panel structure thereto.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. A fastener for securing a panel to a substructure, the fastener comprising:

a body comprising a pair of offset flanges connected to one another by a support structure having a bore formed longitudinally therethrough in generally perpendicular relation to the pair of offset flanges, the offset flanges being constructed and arranged to receive the panel therebetween;

a head comprising a third flange from which extends a shaft, the shaft extending generally perpendicular from the third flange, the head being located a first distance from the offset flanges of the body when the fastener is in a first, preassembled position with the panel located between the offset flanges, the shaft further having formed therein a retaining mechanism constructed and arranged to securely retain the shaft of the fastener within a bore formed in the substructure when the head of the fastener is moved from the first, pre-assembled position to a second, fully assembled position; and, at least one flexible member resiliently connecting the body and the head such that the shaft of the head may pass into and through the bore formed through the support structure, and such that the head is located a second distance from the offset flanges of the body when the fastener is in the second, fully assembled position, the second distance being closer to the offset flanges than the first distance.

2. The fastener of claim 1 wherein the body of the fastener further comprises at least one retention tab that extends into the space formed between the offset flanges of the head, the retention tab being constructed and arranged to engage a bore formed into the panel structure so as to maintain the fastener in a predetermined location with respect to the panel structure.

3. The fastener of claim 1 wherein the retaining mechanism is chosen from a group consisting of at least one detent extending laterally from the shaft of the head of the fastener, at least one flexible finger extending laterally from the shaft at the head of the fastener, and at least one frustoconical flexible extension that extends laterally and toward the third flange of the head of the fastener.

4. The fastener of claim 1 wherein the support structure of the body of the fastener has been inserted into and retained within an opening formed in a panel structure, the pair of offset flanges of the body of the fastener being positioned on opposing sides of the panel structure.

5. The fastener of claim 4 wherein the fastener is misaligned with at least one other fastener that has been pre-assembled with the panel structure.

6. The fastener of claim 1 wherein the tip of the shaft of the head of the fastener is substantially withdrawn into the support structure when the head of the fastener is in the first, pre-assembled position.

7. A method of assembling a panel structure to a substructure comprising the steps of:

providing a fastener comprising a body having a pair of offset flanges connected in a generally parallel relationship to one another by a support structure, the support structure having an opening formed longitudinally therethrough, a head comprising a third flange from which extends in the direction of the body a shaft having at least one retaining mechanism extending laterally therefrom, the shaft extending at least partially into the bore formed through the support structure, the body and the head of the fastener being interconnected by at least one flexible member, a tip of the shaft of the fastener being substantially withdrawn into the support structure;

pre-assembling the fastener with the panel structure such that the support structure of the body of the fastener is inserted into an opening formed into the panel structure in a predetermined position with regard to the panel structure, the head of the fastener being located a first distance from the offset flanges of the body;

aligning the panel structure with the substructure such that the fastener is aligned with a bore formed through the substructure; and applying force to the head of the fastener so as to insert the shaft of the fastener into the bore formed through the substructure so that the retaining mechanism of the fastener engages the substructure and secures the panel structure to the substructure, and, once secured, the head of the fastener being located a second distance from the offset flanges of the body, such that the second distance is closer to the offset flanges than the first distance.

8. The method of assembling a panel structure with a substructure of claim 7 wherein the support structure of the head may be chosen from a group consisting of a tubular element and an open channel element.

9. The method of assembling a panel structure with a substructure of claim 7 wherein the panel structure is the rocker panel of an automobile and the substructure is the frame of the automobile.

10. The method of claim 7 wherein the body of the fastener further comprises at least one retaining member constructed and arranged to engage a bore formed in the panel structure so as to align the fastener in a predetermined position with regard to the panel structure.

11. A fastener for securing a panel to a substructure, the fastener comprising:

a body comprising a pair of offset flanges connected to one another by a support structure having a bore formed longitudinally therethrough in generally perpendicular relation to the pair of offset flanges, the body further comprising a retention member that extends into the space formed between the offset flanges so as to engage an associated member of the panel structure to maintain the fastener in a predetermined location with respect to the panel structure, a head comprising a third flange from which extends a shaft, the shaft extending generally perpendicular from the third flange, the shaft further having formed therein a retaining mechanism constructed and arranged to securely retain the shaft of the fastener within a bore formed in the substructure when the head of the fastener is moved from a first, pre-assembled position to a second, filly assembled position; and, at least one flexible member resiliently connecting the body and the head such that the shaft of the head may pass into and through the bore formed through the support structure.

12. The fastener of claim 11 wherein the fastener is misaligned with at least one other fastener that has been pre-assembled with the panel structure.

13. The fastener of claim 11 wherein the tip of the shaft of the head of the fastener is substantially withdrawn into the support structure when the head of the fastener is in a first, pre-assembled position.

14. The fastener of claim 11 wherein the retention member of the body comprises at least one retention tab that extends into the space formed between the offset flanges of the head, the retention tab being constructed and arranged to engage a bore formed into the panel structure so as to maintain the fastener in a predetermined location with respect to the panel structure.

15. The fastener of claim 11 wherein the retaining mechanism is chosen from a group consisting of at least one detent extending laterally from the shaft of the head of the fastener, at least one flexible finger extending laterally from the shaft at the head of the fastener, and at least one frustoconical flexible extension that extends laterally and toward the third flange of the head of the fastener.

\* \* \* \* \*